United States Patent
Kim et al.

(10) Patent No.: US 11,921,818 B2
(45) Date of Patent: Mar. 5, 2024

(54) IMAGE RECOGNITION METHOD AND APPARATUS, IMAGE PREPROCESSING APPARATUS, AND METHOD OF TRAINING NEURAL NETWORK

(71) Applicants: SAMSUNG ELECTRONICS CO., LTD., Suwon-si (KR); Seoul National University R&DB Foundation, Seoul (KR)

(72) Inventors: Jang-Hyun Kim, Seoul (KR); Hyun Oh Song, Seoul (KR); Wonho Choo, Seoul (KR); Seungyong Moon, Seoul (KR); Gaon An, Seoul (KR); Hosan Jeong, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 426 days.

(21) Appl. No.: 17/330,495

(22) Filed: May 26, 2021

(65) Prior Publication Data
US 2022/0171999 A1 Jun. 2, 2022

(30) Foreign Application Priority Data
Dec. 1, 2020 (KR) .................. 10-2020-0165958

(51) Int. Cl.
G06F 18/214 (2023.01)
G06V 10/50 (2022.01)
H04N 1/60 (2006.01)

(52) U.S. Cl.
CPC .......... *G06F 18/2148* (2023.01); *G06V 10/50* (2022.01); *H04N 1/6063* (2013.01)

(58) Field of Classification Search
CPC ... G06F 18/2148; G06V 10/50; H04N 1/6063
See application file for complete search history.

(56) References Cited

U.S. PATENT DOCUMENTS

2020/0389635 A1* 12/2020 Afifi .................. G06V 10/56

FOREIGN PATENT DOCUMENTS

| CN | 110555382 A | 12/2019 |
|----|-------------|---------|
| CN | 111488763 A | 8/2020 |

(Continued)

OTHER PUBLICATIONS

Guo, Jiayi, et al. "Automatic Color Correction for Multisource Remote Sensing Images with Wasserstein CNN." Remote Sensing 9.5 (2017): 483 (16 pages in English).

(Continued)

*Primary Examiner* — David Perlman
(74) *Attorney, Agent, or Firm* — NSIP Law

(57) ABSTRACT

A method includes obtaining a color transformation matrix that removes color distortion of an original color histogram of a target color space for an input image of an original color space; obtaining a color transformation image of the original color space from which color distortion of the input image is removed using the color transformation matrix; and obtaining a space transformation image with a minimum target loss value between an output vector of a neural network for one of candidate images and each of a plurality of candidate class vectors of the input image, the candidate images being spaced apart from the color transformation image of the original color space by a distance less than a threshold.

18 Claims, 7 Drawing Sheets

(56) References Cited

FOREIGN PATENT DOCUMENTS

| | | |
|---|---|---|
| JP | 2015-203946 A | 11/2015 |
| JP | 2019-164618 A | 9/2016 |
| KR | 10-0849845 B1 | 8/2008 |
| KR | 10-2134405 B1 | 7/2020 |

OTHER PUBLICATIONS

Chan, Tony, Selim Esedoglu, and Kangyu Ni. "Histogram Based Segmentation Using Wasserstein Distances." International Conference on Scale Space and Variational Methods in Computer Vision. Springer, Berlin, Heidelberg, 2007 (12 pages in English).

Jaderberg, Max, et al. "Spatial Transformer Networks." arXiv preprint arXiv:1506.02025 (2015) (15 pages in English).

Lin, Chen-Hsuan, and Simon Lucey. "Inverse Compositional Spatial Transformer Networks." Proceedings of the IEEE Conference on Computer Vision and Pattern Recognition. 2017 (9 pages in English).

Detlefsen, Nicki Skafte, Oren Freifeld, and Søren Hauberg. "Deep Diffeomorphic Transformer Networks." Proceedings of the IEEE Conference on Computer Vision and Pattern Recognition. 2018 (10 pages in English).

\* cited by examiner

IMAGE RECOGNITION METHOD AND APPARATUS, IMAGE PREPROCESSING APPARATUS, AND METHOD OF TRAINING NEURAL NETWORK

CROSS-REFERENCE TO RELATED APPLICATIONS

This application claims the benefit under 35 USC § 119(a) of Korean Patent Application No. 10-2020-0165958, filed on Dec. 1, 2020, in the Korean Intellectual Property Office, the entire disclosure of which is incorporated herein by reference for all purposes.

BACKGROUND

1. Field

The following description relates to preprocessing an image that is to be input to a neural network for image recognition, and more particularly, to mitigating distortion in an image.

2. Description of Related Art

A neural network that recognizes an image is trained based on a variety of training data. As the diversity of the training data increases, the accuracy of the neural network increases. However, as the number of pieces of training data increases, an amount of time for training may increase, and a cost issue may be caused by acquiring training data reflecting all cases.

By preprocessing an input image that is to be input to a neural network for image recognition, an accuracy of recognition may increase. For example, preprocessing may be performed through modeling of Affine transformation, to mitigate distortion of an image caused by rotation or translation. However, if more complex spatial distortion or color distortion, instead of simple rotation or translation, is applied to the input image, it is difficult to derive an accurate recognition result through the Affine transformation only.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes obtaining a color transformation matrix that removes color distortion of an original color histogram of a target color space for an input image of an original color space, obtaining a color transformation image of the original color space from which color distortion of the input image is removed using the color transformation matrix, and obtaining a space transformation image with a minimum target loss value between an output vector of a neural network for one of candidate images and each of a plurality of candidate class vectors of the input image, the candidate images being spaced apart from the color transformation image of the original color space by a distance less than a threshold.

The method may further include outputting, as a final class vector, a candidate class vector corresponding to a lowest target loss value among target loss values between space transformation images obtained for each of the candidate class vectors and the respective candidate class vectors.

The method may further include outputting a recognition result corresponding to the final class vector.

The obtaining of the color transformation matrix may include obtaining a transformed color histogram by removing the color distortion of the original color histogram, and obtaining the color transformation matrix between the original color histogram and the transformed color histogram.

The obtaining of the color transformation matrix between the original color histogram and the transformed color histogram may include, in response to a matrix product between a unit vector and at least one candidate transformation matrix being the original color histogram and in response to a matrix product between a unit vector and a transpose of the at least one candidate transformation matrix being the transformed color histogram, outputting a candidate transformation matrix having a minimum matrix product with a cost matrix as the color transformation matrix.

The obtaining of the color transformation image may include transforming the input image of the original color space into an input image of the target color space, obtaining the input image of the target color space by performing a matrix multiplication between the color transformation matrix and the input image of the target color space, and transforming the input image of the target color space into the color transformation image of the original color space.

The obtaining of the space transformation image may include selecting at least one candidate image spaced apart from the color transformation image of the original color space by a distance less than the threshold, calculating a target loss value between an output vector of the neural network for the at least one candidate image and one candidate class vector among the plurality of candidate class vectors, and outputting a candidate image with a minimum target loss value as the space transformation image for the one candidate class vector.

In another general aspect, a processor-implement method of training a neural network includes obtaining a color transformation matrix that removes color distortion of an original color histogram of a target color space for a current training image of an original color space, obtaining a color transformation image of the original color space from which color distortion of the current training image is removed using the color transformation matrix, obtaining a space transformation image with a minimum target loss value between an output vector of the neural network for one of candidate images and a correct answer class vector of the current training image, the candidate images being spaced apart from the color transformation image of the original color space by a distance less than a threshold, obtaining a comparison loss value between an output vector of the neural network for the space transformation image and an incorrect answer class vector having a lowest loss value with the output vector among a plurality of class vectors, and updating a parameter of the neural network so that the target loss value decreases and a difference between the target loss value and the comparison loss value is greater than or equal to a loss value difference.

The obtaining of the color transformation matrix may include obtaining a transformed color histogram by removing the color distortion of the original color histogram, and obtaining the color transformation matrix between the original color histogram and the transformed color histogram.

The obtaining of the color transformation matrix between the original color histogram and the transformed color histogram may include, in response to a matrix product between a unit vector and at least one candidate transformation matrix being the original color histogram and in response to a matrix product between a unit vector and a transpose of the at least one candidate transformation matrix being the transformed color histogram, outputting a candidate transformation matrix having a minimum matrix product with a cost matrix as the color transformation matrix.

The obtaining of the color transformation image may include transforming the current training image of the original color space into a current training image of the target color space, obtaining a color transformation image of the target color space by performing a matrix multiplication between the color transformation matrix and the current training image of the target color space, and transforming the color transformation image of the target color space into the color transformation image of the original color space.

The obtaining of the space transformation image may include selecting at least one candidate image spaced apart from the color transformation image of the original color space by a distance less than the threshold, calculating a target loss value between an output vector of the neural network for the at least one candidate image and the correct answer class vector of the current training image, and outputting a candidate image with a minimum target loss value as the space transformation image.

The obtaining of the comparison loss value may include obtaining an output vector for the space transformation image using the neural network, calculating loss values of the output vector for each of a plurality of incorrect answer class vectors that are different from the correct answer class vector, and outputting a loss value of an incorrect answer class vector corresponding to a lowest loss value among the calculated loss values, as the comparison loss value.

The updating of the parameter of the neural network may include calculating a current sum result by performing a subtraction between the target loss value and the comparison loss value and by summing a loss value difference to a result of the subtraction, in response to the current sum result being greater than or equal to "0", accumulating the current sum result to a sum result of a previous training image, and updating the parameter of the neural network so that a result obtained by accumulating sum results of all training images including the current training image and the previous training image is minimized.

A non-transitory computer-readable storage medium may store instructions that, when executed by a processor, cause the processor to perform the method.

In another general aspect, an apparatus includes one or more processors configured to extract a color histogram from an input image represented in an original color space and obtain an original color histogram represented in a target color space; obtain a transformed color histogram by removing color distortion from the original color histogram; obtain a color transformation function from the original color histogram and the transformed color histogram; input the input image to the color transformation function and output a color transformation image; and perform a transform on a pixel related to the color transformation image and obtain space transformation images for each of a plurality of candidate class vectors corresponding to recognition results classified in a neural network.

The one or more processors may be configured to input the space transformation images to the neural network and output a recognition result.

A candidate class vector corresponding to a lowest loss value among loss values of the space transformation images for each of the plurality of candidate class vectors may be output as the final recognition result.

Other features and aspects will be apparent from the following detailed description, the drawings, and the claims.

Figure 1:
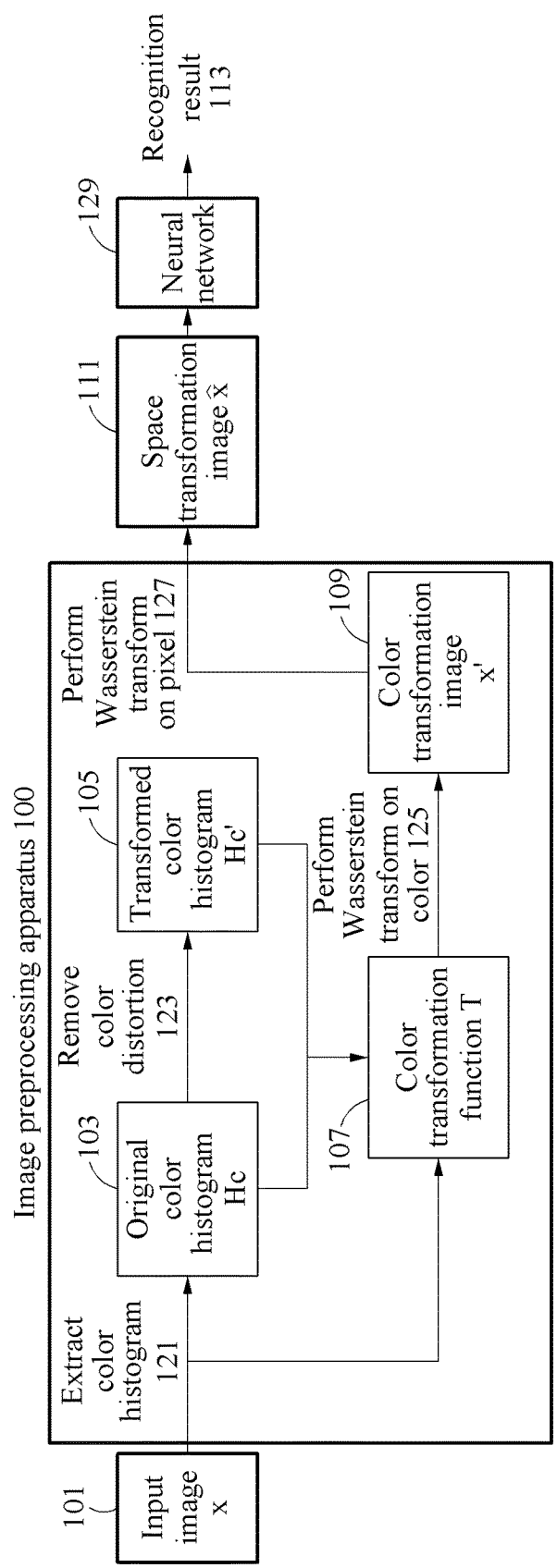
FIG. 1 illustrates an example of an overall configuration of an image recognition apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first"

component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. As used herein, the term "and/or" includes any one and any combination of any two or more of the associated listed items. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings, and like reference numerals in the drawings refer to like elements throughout.

FIG. 1 illustrates an example of an overall configuration of an image recognition apparatus.

Artificial intelligence technologies using neural networks are continuously developing and are applied to fields of processing images, speech and languages. In a field such as autonomous driving or medical care, an accuracy is important. In such a field in which the accuracy is important, neural networks need to be highly robust against distortion contained in input data.

An image that is to be input to a neural network for processing an image may include a variety of distortion and noise. For example, an image may have color distortion or spatial distortion, and a portion of the image may be obscured by occlusion. Due to such distortion included in the image, an accuracy of recognition of the neural network may decrease.

In an example, an image preprocessing apparatus 100 may preprocess an image to be input to a neural network, in order to mitigate distortion. The image preprocessing apparatus 100 may output an image in which color distortion and spatial distortion are mitigated through the preprocessing. The preprocessed image may be input to the neural network, and a recognition result may be output. The image preprocessing apparatus 100 may be included in the image recognition apparatus (not shown). The image recognition apparatus may include a neural network 129 that outputs a recognition result 113, and the image preprocessing apparatus 100 that transfers an image from which distortion is removed to the neural network 129.

Referring to FIG. 1, the image preprocessing apparatus 100 may receive the input image x 101 and may output a space transformation image $\hat{x}$ 111 from which distortion is removed. The image preprocessing apparatus 100 may output the space transformation image $\hat{x}$ 111 from which color distortion and spatial distortion are removed through a transform in a color space and a Wasserstein transform in a pixel space. The output space transformation image $\hat{x}$ 111 may be input to a pre-trained neural network, for example, the neural network 129, and the recognition result 113 may be output.

In operation 121, the image preprocessing apparatus 100 may extract a color histogram from the input image x 101 and may obtain an original color histogram Hc 103. The input image x 101 may be represented in an original color space, and the original color histogram Hc 103 may be represented in a target color space.

In operation 123, the image preprocessing apparatus 100 may obtain a transformed color histogram Hc' 105 by removing color distortion. The image preprocessing apparatus 100 may perform histogram binning and thresholding on the original color histogram Hc 103. As a result of the histogram binning and the thresholding, the transformed color histogram Hc' 105 may be output. The transformed color histogram Hc' 105 may be represented as a target color space.

The image preprocessing apparatus 100 may obtain a color transformation function T 107 from the original color histogram Hc 103 and the transformed color histogram Hc' 105. For example, the image preprocessing apparatus 100 may obtain a color transformation matrix $\hat{\pi}$ from the original color histogram Hc 103 and the transformed color histogram Hc' 105. The color transformation matrix $\hat{\pi}$ may be a transformation matrix for minimizing a Wasserstein distance between the original color histogram Hc 103 and the transformed color histogram Hc' 105. The color transformation matrix $\hat{\pi}$ may be defined in a target color space and may perform a transformation between images of the target color space.

The image preprocessing apparatus 100 may apply a color space transform to the color transformation matrix $\hat{\pi}$, to obtain the color transformation function T 107. The color transformation function T 107 may be defined in the original color space and may perform a transformation between images of the original color space.

In operation 125, the image preprocessing apparatus 100 may perform a Wasserstein transform on a color of the input image x 101 and may obtain a color transformation image x' 109. The image preprocessing apparatus 100 may input the input image x 101 to the color transformation function T 107 and may output the color transformation image x' 109 from which color distortion is removed. For example, an output T(x) of the color transformation function T 107 may be the same as the color transformation image x' 109.

In operation 127, the image preprocessing apparatus 100 may perform a Wasserstein transform on a pixel and may obtain the space transformation image $\hat{x}$ 111. For example, the image preprocessing apparatus 100 may obtain space transformation images $\hat{x}$ 111 for each of a plurality of candidate class vectors corresponding to recognition results classified in a neural network.

The space transformation image $\hat{x}$ 111 may be input to the neural network 129, and the recognition result 113 may be output. A candidate class corresponding to a lowest loss value among loss values of the space transformation images $\hat{x}$ 111 for each of the plurality of candidate class vectors may be output as a final recognition result 113.

As described above, the image preprocessing apparatus 100 may apply a Wasserstein transform that reflects the concept of a distance in a predetermined space to a color distribution space and a pixel space of image data, to process a variety of distortion, for example, a weather change, a brightness change, noise, or occlusion of an object. The image preprocessing apparatus 100 may remove color distortion by processing a color distribution of input data with distortion, and may also remove spatial distortion, for example, an occlusion or contortion, by processing distortion in the pixel space. Since the above distortion is removed through the Wasserstein transform, output data may not be significantly different from the original input data. Thus, a natural image, as perceived by a human, may be generated.

The image preprocessing apparatus 100 may increase robustness of a recognizer configured with a neural network. The image preprocessing apparatus 100 may be applied to a field that requires an accurate determination in an arbitrary environment, for example, autonomous driving of a vehicle or a medical field. The image preprocessing apparatus 100 may be applied to an alignment of input images or a removal of voice noise. The image preprocessing apparatus 100 may be coupled to a front end of a recognizer including a neural network that is currently being provided as a real service and may increase robustness of the neural network. The image preprocessing apparatus 100 may be used as an independent module for enhancement of a quality of input data.

Although an example of preprocessing of an image has been described, the above preprocessing is not limited to images. For example, the image preprocessing apparatus 100 may also be used to process voice or text. When the image preprocessing apparatus 100 is applied to data other than images, the image preprocessing apparatus 100 may be referred to as a "preprocessing apparatus".

Figure 2:
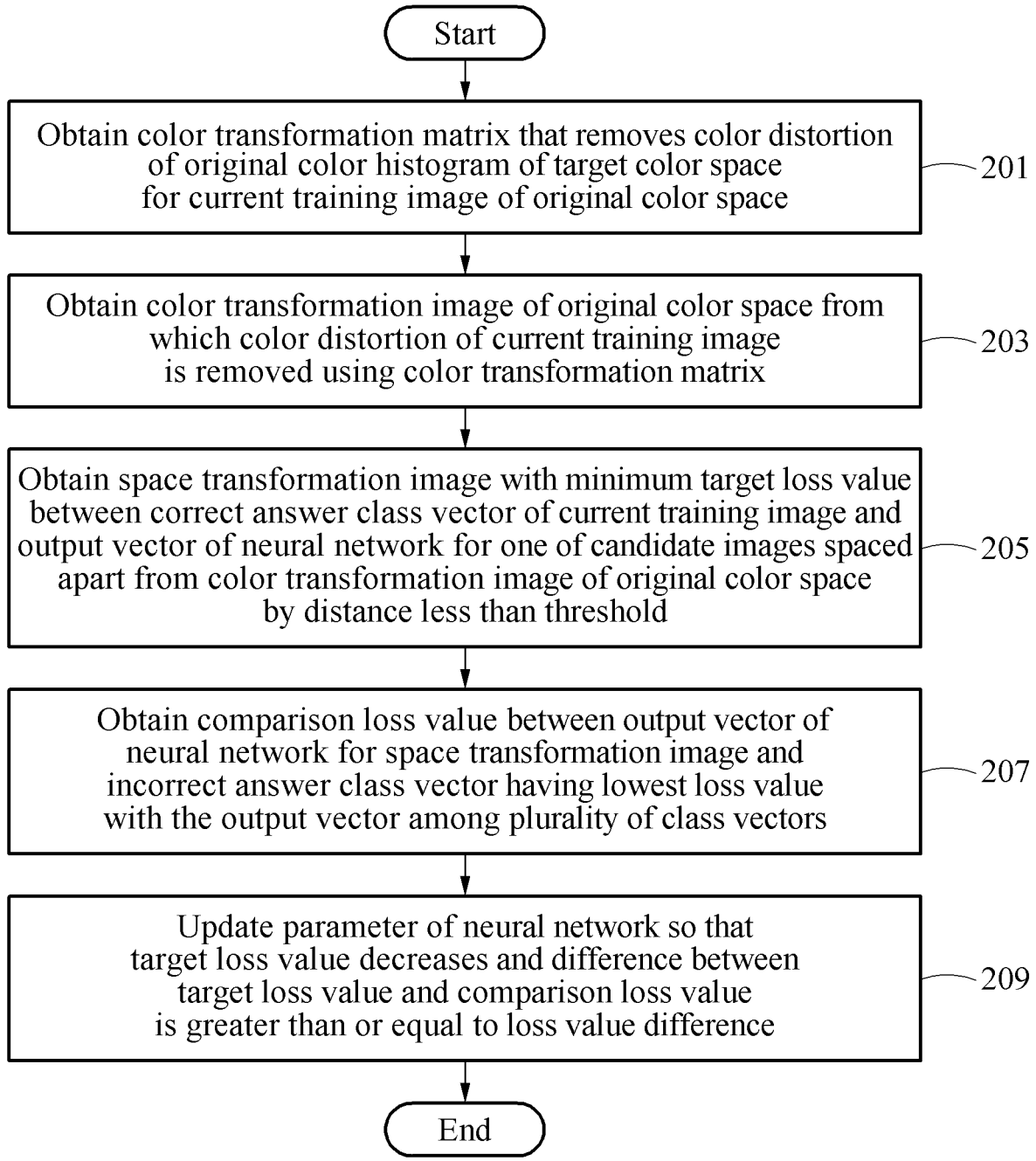
FIG. 2 illustrates an example of a method of training a neural network used in an image recognition apparatus.
Figure 3:
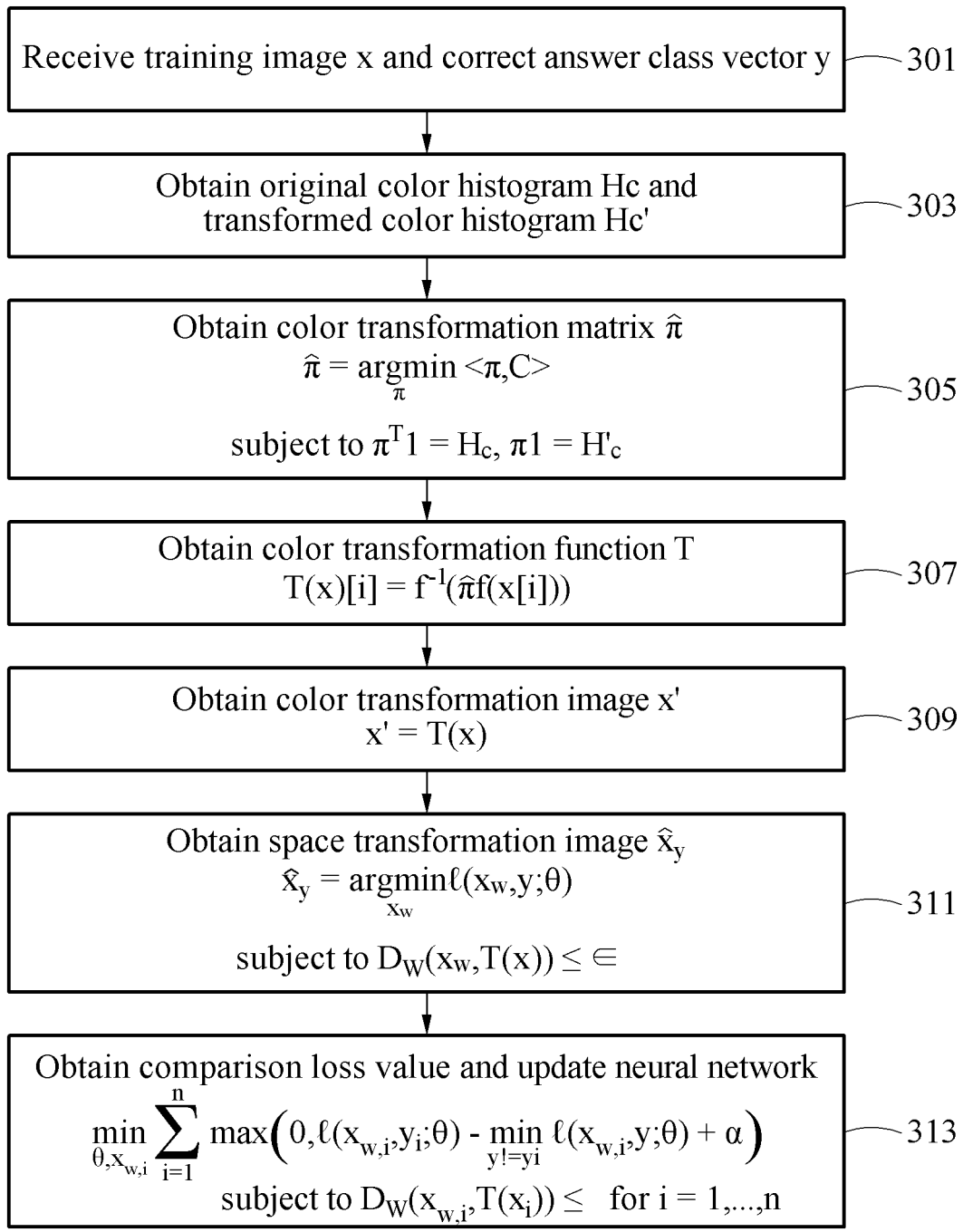
FIG. 3 illustrates an example of a method of training a neural network.

FIG. 2 illustrates an example of a method of training a neural network used in an image recognition apparatus, and FIG. 3 illustrates an example of a method of training a neural network.

Referring to FIG. 2, in operation 201, a training apparatus may obtain a color transformation matrix that removes color distortion of an original color histogram of a target color space for a current training image of an original color space.

For example, in operation 301, the training apparatus may receive a training image x and a correct answer class vector y. The training apparatus may remove color distortion and spatial distortion of the training image x using a Wasserstein transform. The training image x may be represented in an original color space, and an original color histogram Hc may be represented in a target color space. In this example, the current training image may be expressed as "i" that is a random iteration.

In operation 303, the training apparatus may obtain a transformed color histogram Hc' by removing color distortion of the original color histogram Hc. The training apparatus may obtain the original color histogram Hc from the training image x. The training apparatus may remove the color distortion of the original color histogram Hc using histogram binning or thresholding, to obtain the transformed color histogram Hc'.

In operation 305, the training apparatus may obtain a color transformation matrix $\hat{\pi}$ between the original color histogram Hc and the transformed color histogram Hc'. The training apparatus may obtain the color transformation matrix $\hat{\pi}$ using Equation 1 shown below.

$$\hat{\pi} = \operatorname*{argmin}_{\pi} < \pi, C >$$

$$\text{subject to } \pi^T 1 = H_c, \pi 1 = H'_c$$

Equation 1

Based on Equation 1, the training apparatus may output a candidate transformation matrix π having a minimum matrix product with a cost matrix C, as the color transformation matrix $\hat{\pi}$. The cost matrix C may be a cost matrix in a color space. A condition that a matrix product between a unit vector "1" and at least one candidate transformation matrix π is the original color histogram Hc and that a matrix product between a unit vector and a transpose of at least one candidate transformation matrix π is the transformed color histogram Hc' may be satisfied.

If a dimension of the target color space is m, Hc, Hc', and 1 may be m-dimensional vectors, and π and C may be matrices. For example, $\pi_{ij}$ may be a degree by which a j-th color is transformed into an i-th color. For example, the j-th color may be represented by a unit vector $e_j$ with a j-th element having a value of "1", and $\pi e_j$ may denote a transformed color. A condition $\pi^T 1 = H_c$, $\pi 1 = H'_c$ may indicate that a color distribution after transformation needs to be Hc' when a distribution that is not transformed is Hc. An objective function <π, C> may be a sum of element products of two matrices, which may indicate a weighted sum of costs for $\pi_{ij}$. If π moves similar colors to similar colors, for example, if i and j are similar, and if $\pi_{ij}$ has a relatively high value, a value of <π, C> may decrease. If π moves a predetermined color to a different color, the value of <π, C> may increase.

In operation 203, the training apparatus may obtain a color transformation image of the original color space from which color distortion of the current training image is removed using the color transformation matrix. For example, in operation 307, the training apparatus may obtain a color transformation function T using Equation 2 shown below. In operation 309, the training apparatus may obtain a color transformation image x' by inputting the training image x to the color transformation function T.

$$T(x)[i] = f^{-1}(\hat{\pi} f(x[i]))$$

Equation 2:

The training apparatus may transform a current training image x[i] of the original color space into a current training image f(x[i]) of the target color space. The training apparatus may obtain a color transformation image $\hat{\pi} f(x[i])$ of the target color space by performing a matrix multiplication between the color transformation matrix $\hat{\pi}$ and the current training image f(x[i]) of the target color space. The training apparatus may transform the color transformation image $\hat{\pi} f(x[i])$ of the target color space into a color transformation image $f^{-1}(\hat{\pi} f(x[i]))$ of the original color space. The training apparatus may obtain a color transformation image T(x)=x' by performing the above process on all pixels of the training image x.

For example, when the original color space is an RGB color space, and when a transformation of a three-dimensional (3D) RGB value of a predetermined pixel in a target color space is assumed as f, an i-th pixel value x[i] of a training image may be transformed using Equation 2. In Equation 2, x[i], and T(x)[i] denote 3D RGB vectors, and f(x[i]) denotes an m-dimensional color space vector. f(x[i]) may be transformed into a color that is based on a histogram from which color distortion is removed through $\hat{\pi} f(x[i])$, and may be transformed into a 3D RGB vector through $f^{-1}$. Finally, a color transformation image T(x)=x' from which color distortion is removed may be obtained.

In operation 205, the training apparatus may obtain a space transformation image with a minimum target loss value between a correct answer class vector of the current training image and an output vector of the neural network for one of candidate images that are spaced apart from the color transformation image of the original color space by a distance less than a threshold.

For example, in operation 311, the training apparatus may obtain a space transformation image $\hat{x}_y$ sing Equation 3. The training apparatus may select at least one candidate image $x_w$ spaced apart from the color transformation image x' of the original color space by a distance less than a threshold $\epsilon$. The training apparatus may calculate a target loss value $\ell(x_w, y; \theta)$ between an output vector of the neural network for the at least one candidate image $x_w$ and a correct answer class vector y of the current training image. The training apparatus may output a candidate image $x_w$ with a minimum target loss value $\ell(x_w, y; \theta)$ as the space transformation image $\hat{x}_y$.

$$\hat{x}_y = \underset{x_w}{\mathrm{argmin}}\,\ell(x_w, y; \theta) \qquad \text{Equation 3}$$

$$\text{subject to } D_W(x_w, T(x)) \leq \epsilon$$

In operation 207, the training apparatus may obtain a comparison loss value between an output vector of the neural network for the space transformation image and an incorrect answer class vector having a lowest loss value with the output vector among a plurality of class vectors. The training apparatus may obtain an output vector for the space transformation image $\hat{x}_y$ using the neural network. The training apparatus may calculate a loss value $\ell(x_{w,i}, y; \theta)$ of an output vector for each of a plurality of incorrect answer class vectors yl=yi that are different from a correct answer class vector yi. The training apparatus may output a loss value of an incorrect answer class vector yl=yi corresponding to a minimum loss value $$\min_{yl=yi} \ell(x_{w,i}, y; \theta)$$

among one or more loss values, as a comparison loss value.

In operation 209, the training apparatus may update a parameter of the neural network so that the target loss value may decrease and that a difference between the target loss value and the comparison loss value may be greater than or equal to a loss value difference. For example, in operation 313, the training apparatus may update the neural network based on Equation 4 shown below.

$$\min_{\theta, x_{w,i}} \sum_{i=1}^{n} \max\left(0, \ell(x_{w,i}, y_i; \theta) - \min_{yl=yi}\ell(x_{w,i}, y; \theta) + \alpha\right) \qquad \text{Equation 4}$$

$$\text{subject to } D_W(x_{w,i}, T(x_i)) \leq \epsilon \text{ for } i = 1, \ldots, n$$

The training apparatus may obtain a result of a subtraction between the target loss value $\ell(x_{w,i}, y_i; \theta)$ and the comparison loss value $$\min_{yl=yi}\ell(x_{w,i}, y; \theta),$$

may sum a loss value difference $\alpha$ to the result of the subtraction, and may calculate a sum result of a current training image i. When the sum result is greater than or equal to "0", the training apparatus may accumulate the sum result of the current training image i to a sum result of a previous training image. The training apparatus may update a parameter $\theta$ of the neural network so that a result obtained by accumulating sum results of all training images including a current training image and a previous training image may be minimized.

In Equation 4, y denotes a label of the training image x, $\theta$ denotes a parameter of an artificial neural network, and $\ell$ denotes a loss function. The loss function $\ell$ may be used to optimize data $x_w$ to reduce a loss value. However, since the goal is to find $x_w$ that does not excessively differ from the color transformation image T(x) while minimizing spatial distortion, $x_w$ may need to be optimized within a range in which a Wasserstein distance $D_W$ reflecting a spatial characteristic is less than a preset value $\epsilon$. Also, to increase generalization performance, a hinge loss function that allows a difference with the comparison loss function value $$\min_{yl=yi}\ell(x_{w,i}, y; \theta)$$

for a class that is most confused by the neural network to be greater than or equal to $\alpha$ may be applied.

Since a Wasserstein distance reflects a spatial characteristic, a degree of change based on spatial movement of an object may be effectively measured. Thus, by solving Equation 4, data accurately recognized by the neural network may be obtained because the data is not significantly spatially different from an existing input value T(x). In other words, data from which spatial distortion is removed may be obtained.

Figure 4:
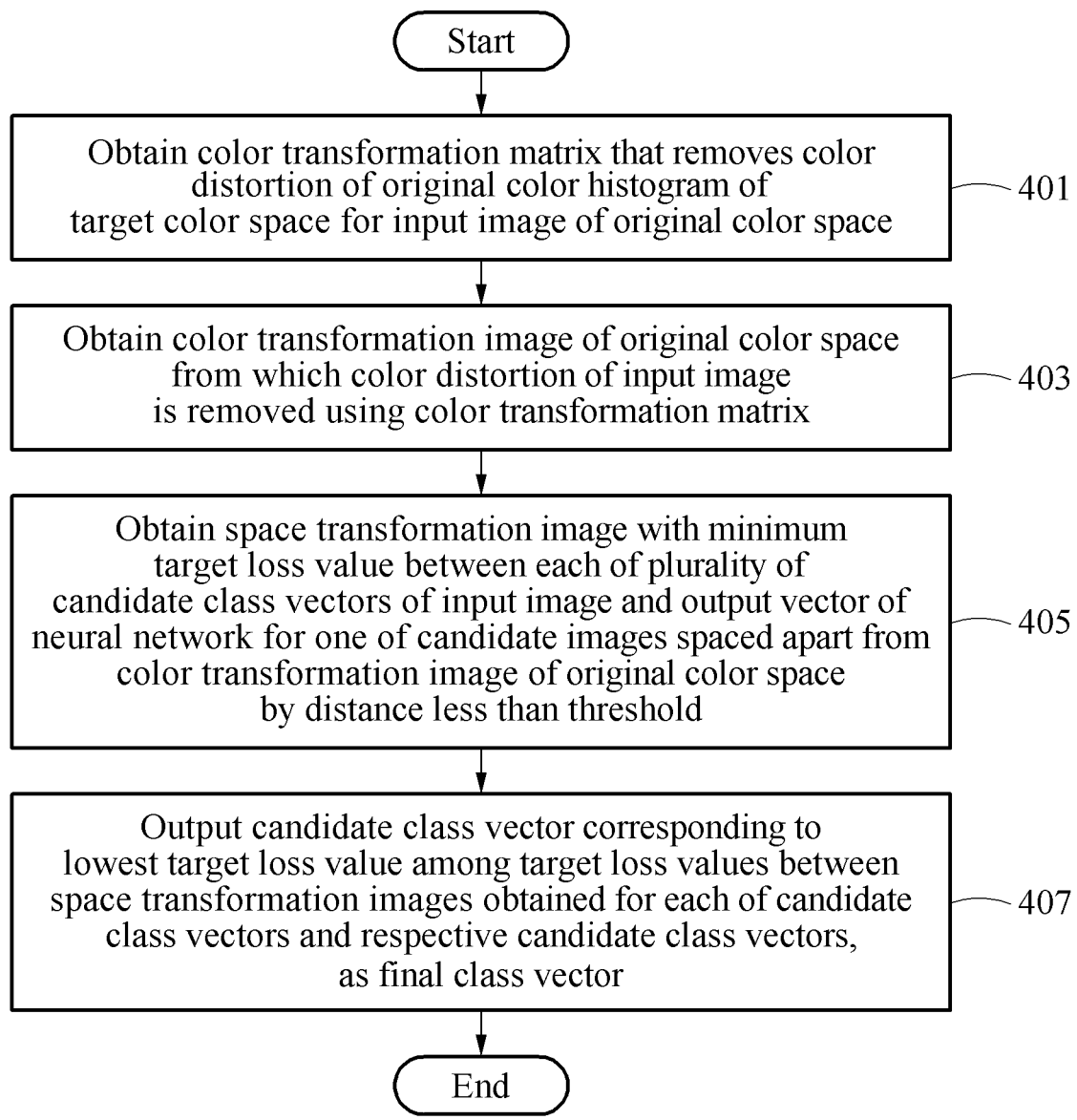
FIG. 4 illustrates an example of an image recognition method.
Figure 5:
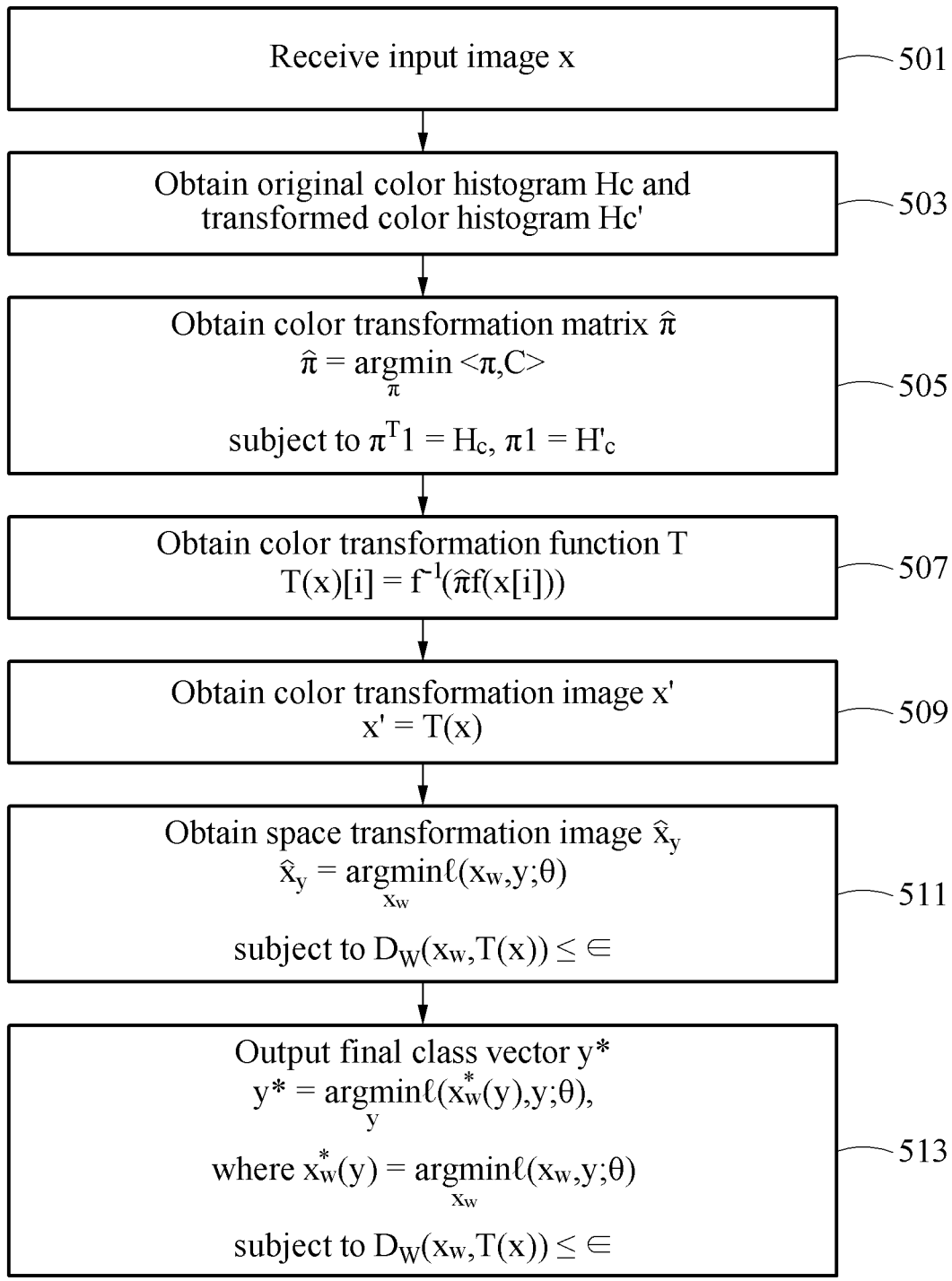
FIG. 5 illustrates another example of an image recognition method.

FIG. 4 illustrates an example of an image recognition method. FIG. 5 illustrates another example of an image recognition method.

In operation 401, an image recognition apparatus may obtain a color transformation matrix that removes color distortion of an original color histogram of a target color space for an input image of an original color space.

For example, in operation 501, the image recognition apparatus may receive a training image x. The image recognition apparatus may remove color distortion and spatial distortion of a training image using a Wasserstein transform. The training image x may be represented in the original color space, and an original color histogram Hc may be represented in the target color space. In this example, a current training image may be expressed as "i" that is a random iteration.

In operation 503, the image recognition apparatus may obtain a transformed color histogram Hc' by removing color distortion of the original color histogram Hc. The image recognition apparatus may acquire the original color histogram Hc from the training image x. The image recognition apparatus may remove the color distortion of the original color histogram Hc using histogram binning or thresholding, and may obtain the transformed color histogram Hc'.

In operation 505, the image recognition apparatus may obtain a color transformation matrix $\pi$ between the original color histogram Hc and the transformed color histogram Hc'. The image recognition apparatus may obtain the color transformation matrix $\hat{\pi}$ using Equation 5 shown below. Equation 5 may be the same as Equation 1.

$$\hat{\pi} = \underset{\pi}{\mathrm{argmin}}\langle \pi, C \rangle \qquad \text{Equation 5}$$

$$\text{subject to } \pi^T 1 = H_c, \pi 1 = H'_c$$

Based on Equation 5, the image recognition apparatus may output a candidate transformation matrix π having a minimum matrix product with a cost matrix C, as a color transformation matrix $\hat{\pi}$. The cost matrix C may be a cost matrix in a color space. A condition that a matrix product between a unit vector "1" and at least one candidate transformation matrix π is the original color histogram Hc and that a matrix product between a unit vector and a transpose of at least one candidate transformation matrix π is the transformed color histogram Hc' may be satisfied.

In operation 403, the image recognition apparatus may obtain a color transformation image of the original color space from which color distortion of the input image is removed using the color transformation matrix. For example, in operation 507, the image recognition apparatus may obtain a color transformation function T using Equation 6 shown below. In operation 509, the image recognition apparatus may obtain a color transformation image x' by inputting the training image x to the color transformation function T.

$$T(x)[i] = f^{-1}(\hat{\pi}f(x[i])) \quad \text{Equation 6:}$$

The image recognition apparatus may transform a current training image x[i] of the original color space into a current training image f(x[i]) of the target color space. The image recognition apparatus may obtain a color transformation image $\hat{\pi}f(x[i])$ of the target color space by performing a matrix multiplication between the color transformation matrix $\hat{\pi}$ and the current training image f(x[i]) of the target color space. The image recognition apparatus may transform the color transformation image $\hat{\pi}f([i])$ of the target color space into a color transformation image $f^{-1}(\hat{\pi}f(x[i]))$ of the original color space. The image recognition apparatus may obtain a color transformation image T(x)=x' by performing the above process on all pixels of the training image x.

In operation 405, the image recognition apparatus may obtain a space transformation image with a minimum target loss value between each of a plurality of candidate class vectors of the input image and an output vector of a neural network for one of candidate images that are spaced apart from the color transformation image of the original color space by a distance less than a threshold. For example, in operation 511, the image recognition apparatus may obtain space transformation images $\hat{x}_y$ for each of a plurality of candidate class vectors using Equation 7 shown below.

$$\hat{x}_y = \underset{x_w}{\arg\min}\ell(x_w, y; \theta) \quad \text{Equation 7}$$

$$\text{subject to } D_W(x_w, T(x)) \leq \in$$

For one candidate class vector among the plurality of candidate class vectors, the image recognition apparatus may select at least one candidate image $x_w$ spaced apart from the color transformation image x' of the original color space by a distance less than a threshold ∈. The image recognition apparatus may calculate a target loss value $\ell(x_w, y; \theta)$ between an output vector of the neural network for the at least one candidate image $x_w$ and a candidate class vector y. The image recognition apparatus may output a candidate image $x_w$ with a minimum target loss value $\ell(x_w, y; \theta)$ as a space transformation image for the candidate class vector y.

In operation 407, the image recognition apparatus may output a candidate class vector corresponding to a lowest target loss value among target loss values between space transformation images obtained for each of the candidate class vectors and the respective candidate class vectors, as a final class vector. For example, in operation 513, the image recognition apparatus may output a final class vector y* using Equation 8 shown below.

$$y^* = \underset{y}{\arg\min}\ell(x_w^*(y), y; \theta), \quad \text{Equation 8}$$

$$\text{where } x_w^*(y) = \underset{x_w}{\arg\min}\ell(x_w, y; \theta)$$

$$\text{subject to } D_W(x_w, T(x)) \leq \in$$

The image recognition apparatus may input a space transformation image $\hat{x}_y = x^*_w(y)$ corresponding to each of the plurality of candidate class vectors y to a neural network with a parameter θ and may output an output vector. The image recognition apparatus may calculate a loss value $\ell(x^*_w(y), y; \theta)$ based on the output vector and a corresponding candidate class vector y. The image recognition apparatus may output a candidate class vector y with a lowest loss value as a final class vector y*. Subsequently, the image recognition apparatus may output a recognition result corresponding to the final class vector y*.

Figure 6:
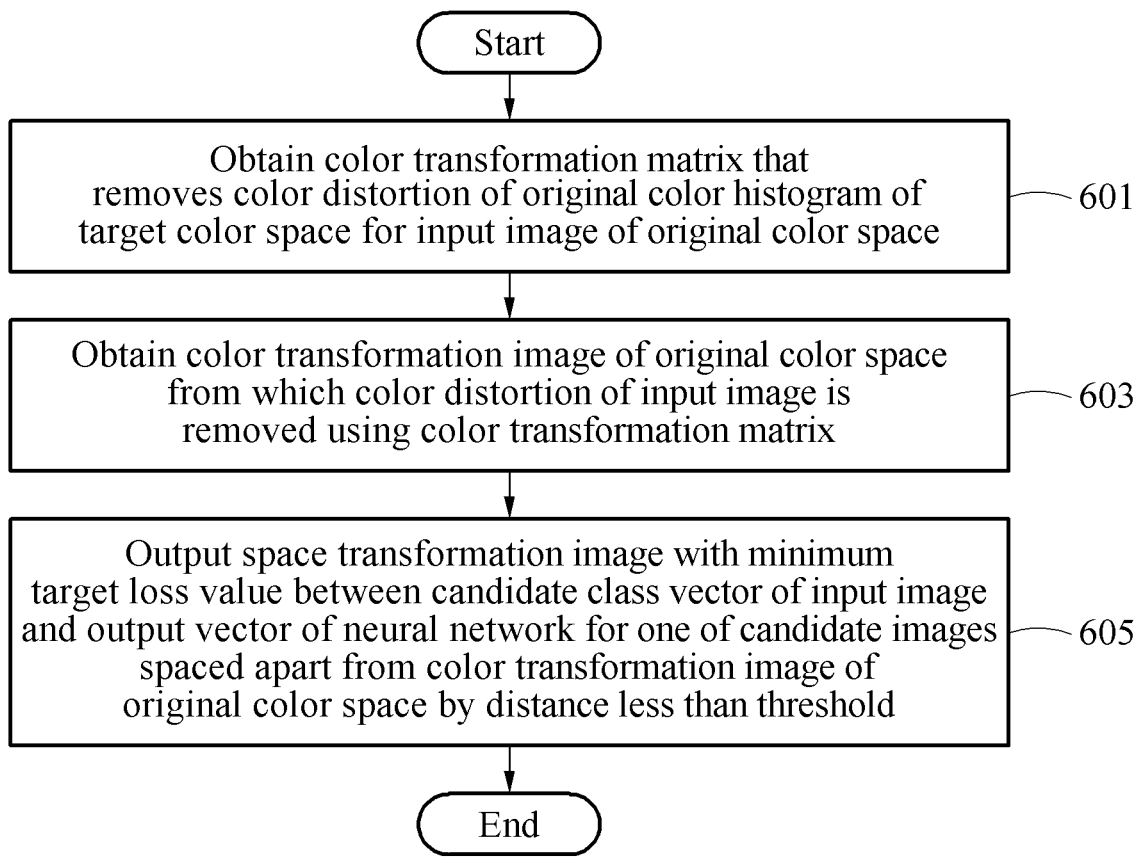
FIG. 6 illustrates an example of an image preprocessing method.

FIG. 6 illustrates an example of an image preprocessing method.

An image recognition apparatus may include an image preprocessing apparatus. The image preprocessing apparatus may be disposed in front of a recognizer including a neural network and may preprocess an image that is to be input to the neural network. The image preprocessing apparatus may mitigate color distortion and spatial distortion of an image, so that the neural network may output a more accurate result.

In operation 601, an image preprocessing apparatus may obtain a color transformation matrix that removes color distortion of an original color histogram of a target color space for an input image of an original color space.

In operation 603, the image preprocessing apparatus may obtain a color transformation image of the original color space from which color distortion of the input image is removed using the color transformation matrix.

In operation 605, the image preprocessing apparatus may output a space transformation image with a minimum target loss value between a candidate class vector of the input image and an output vector of a neural network for one of candidate images that are spaced apart from the color transformation image of the original color space by a distance less than a threshold.

Figure 7:
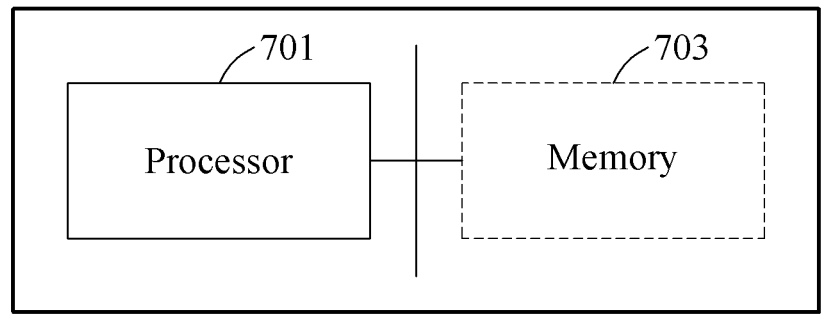
FIG. 7 illustrates an example of a configuration of an apparatus for training a neural network.

FIG. 7 illustrates an example of a configuration of a neural network training apparatus (hereinafter, referred to as a "training apparatus").

In an example, the training apparatus may include at least one processor 701. The training apparatus may further include a memory 703.

The processor 701 may obtain a color transformation matrix that removes color distortion of an original color histogram of a target color space for a current training image of an original color space.

The processor 701 may obtain a color transformation image of the original color space from which color distortion of the current training image is removed using the color transformation matrix.

The processor 701 may obtain a space transformation image with a minimum target loss value between a correct answer class vector of the current training image and an output vector of a neural network for one of candidate images that are spaced apart from the color transformation image of the original color space by a distance less than a threshold.

The processor 701 may obtain a comparison loss value between an output vector of the neural network for the space transformation image and an incorrect answer class vector having a lowest loss value with the output vector among a plurality of class vectors.

The processor 701 may update a parameter of the neural network so that the target loss value may decrease and a difference between the target loss value and the comparison loss value may be greater than or equal to a loss value difference.

Figure 8:
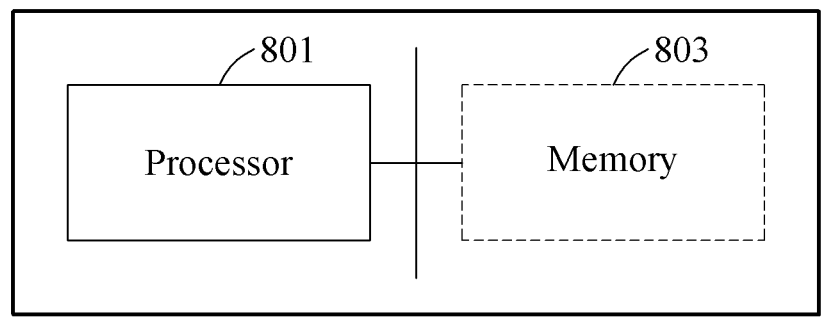
FIG. 8 illustrates an example of a configuration of an image preprocessing apparatus or an image recognition apparatus.

FIG. 8 illustrates an example of a configuration of an image preprocessing apparatus or an image recognition apparatus.

The image preprocessing apparatus may include at least one processor 801. The image preprocessing apparatus may further include a memory 803.

The processor 801 of the image preprocessing apparatus may obtain a color transformation matrix that removes color distortion of an original color histogram of a target color space for an input image of an original color space.

The processor 801 may obtain a color transformation image of the original color space from which color distortion of the input image is removed using the color transformation matrix.

The processor 801 may output a space transformation image with a minimum target loss value between a candidate class vector of the input image and an output vector of a neural network for one of candidate images that are spaced apart from the color transformation image of the original color space by a distance less than a threshold.

The image recognition apparatus may include the image preprocessing apparatus, and a neural network that outputs a recognition result. In an example, the image recognition apparatus may share the processor 801 and the memory 803 with the image preprocessing apparatus. In another example, each of the image recognition apparatus and the image preprocessing apparatus may include a separate processor and a separate memory. However, for understanding of description, the image recognition apparatus and the image preprocessing apparatus are assumed to share the processor 801 and the memory 803.

The processor 801 of the image recognition apparatus may obtain a color transformation matrix that removes color distortion of an original color histogram of a target color space for an input image of an original color space.

The processor 801 may obtain a color transformation image of the original color space from which color distortion of the input image is removed using the color transformation matrix.

The processor 801 may output a space transformation image with a minimum target loss value between a candidate class vector of the input image and an output vector of a neural network for one of candidate images that are spaced apart from the color transformation image of the original color space by a distance less than a threshold.

The processor 801 may output a candidate class vector corresponding to a lowest target loss value among target loss values between space transformation images obtained for each of the candidate class vectors and the respective candidate class vectors, as a final class vector.

The apparatuses, units, modules, devices, and other components described herein with respect to FIGS. 1-8, such as the image recognition apparatus, image preprocessing apparatus 100, processor 701, memory 703, processor 801, and memory 803, are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing software, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method comprising:
   obtaining a color transformation matrix that removes color distortion of an original color histogram of a target color space for an input image of an original color space;
   obtaining a color transformation image of the original color space from which color distortion of the input image is removed using the color transformation matrix; and
   obtaining a space transformation image with a minimum target loss value between an output vector of a neural network for one of candidate images and each of a plurality of candidate class vectors of the input image, the candidate images being spaced apart from the color transformation image of the original color space by a distance less than a threshold.

2. The method of claim 1, further comprising outputting, as a final class vector, a candidate class vector corresponding to a lowest target loss value among target loss values between space transformation images obtained for each of the candidate class vectors and the respective candidate class vectors.

3. The method of claim 2, further comprising outputting a recognition result corresponding to the final class vector.

4. The method of claim 1, wherein obtaining the color transformation matrix comprises:
   obtaining a transformed color histogram by removing the color distortion of the original color histogram; and
   obtaining the color transformation matrix between the original color histogram and the transformed color histogram.

5. The method of claim 4, wherein obtaining the color transformation matrix between the original color histogram and the transformed color histogram comprises, in response to a matrix product between a unit vector and at least one candidate transformation matrix being the original color histogram and in response to a matrix product between a unit vector and a transpose of the at least one candidate transformation matrix being the transformed color histogram, outputting a candidate transformation matrix having a minimum matrix product with a cost matrix as the color transformation matrix.

6. The method of claim 1, wherein obtaining the color transformation image comprises:
   transforming the input image of the original color space into an input image of the target color space;
   obtaining the input image of the target color space by performing a matrix multiplication between the color transformation matrix and the input image of the target color space; and
   transforming the input image of the target color space into the color transformation image of the original color space.

7. The method of claim 1, wherein obtaining the space transformation image comprises:

selecting at least one candidate image spaced apart from the color transformation image of the original color space by a distance less than the threshold;

calculating a target loss value between an output vector of the neural network for the at least one candidate image and one candidate class vector among the plurality of candidate class vectors; and outputting a candidate image with a minimum target loss value as the space transformation image for the one candidate class vector.

8. A non-transitory computer-readable storage medium storing instructions that, when executed by a processor, cause the processor to perform the method of claim 1.

9. A processor-implemented method of training a neural network, the method comprising:

obtaining a color transformation matrix that removes color distortion of an original color histogram of a target color space for a current training image of an original color space;

obtaining a color transformation image of the original color space from which color distortion of the current training image is removed using the color transformation matrix;

obtaining a space transformation image with a minimum target loss value between an output vector of the neural network for one of candidate images and a correct answer class vector of the current training image, the candidate images being spaced apart from the color transformation image of the original color space by a distance less than a threshold;

obtaining a comparison loss value between an output vector of the neural network for the space transformation image and an incorrect answer class vector having a lowest loss value with the output vector among a plurality of class vectors; and updating a parameter of the neural network so that the target loss value decreases and a difference between the target loss value and the comparison loss value is greater than or equal to a loss value difference.

10. The method of claim 9, wherein obtaining the color transformation matrix comprises:

obtaining a transformed color histogram by removing the color distortion of the original color histogram; and obtaining the color transformation matrix between the original color histogram and the transformed color histogram.

11. The method of claim 10, wherein obtaining the color transformation matrix between the original color histogram and the transformed color histogram comprises, in response to a matrix product between a unit vector and at least one candidate transformation matrix being the original color histogram and in response to a matrix product between a unit vector and a transpose of the at least one candidate transformation matrix being the transformed color histogram, outputting a candidate transformation matrix having a minimum matrix product with a cost matrix as the color transformation matrix.

12. The method of claim 9, wherein obtaining the color transformation image comprises:

transforming the current training image of the original color space into a current training image of the target color space;

obtaining a color transformation image of the target color space by performing a matrix multiplication between the color transformation matrix and the current training image of the target color space; and transforming the color transformation image of the target color space into the color transformation image of the original color space.

13. The method of claim 9, wherein obtaining the space transformation image comprises:

selecting at least one candidate image spaced apart from the color transformation image of the original color space by a distance less than the threshold;

calculating a target loss value between an output vector of the neural network for the at least one candidate image and the correct answer class vector of the current training image; and outputting a candidate image with a minimum target loss value as the space transformation image.

14. The method of claim 9, wherein obtaining the comparison loss value comprises:

obtaining an output vector for the space transformation image using the neural network;

calculating loss values of the output vector for each of a plurality of incorrect answer class vectors that are different from the correct answer class vector; and outputting a loss value of an incorrect answer class vector corresponding to a lowest loss value among the calculated loss values, as the comparison loss value.

15. The method of claim 9, wherein updating the parameter of the neural network comprises:

calculating a current sum result by performing a subtraction between the target loss value and the comparison loss value and by summing a loss value difference to a result of the subtraction;

in response to the current sum result being greater than or equal to "0", accumulating the current sum result to a sum result of a previous training image; and updating the parameter of the neural network so that a result obtained by accumulating sum results of all training images including the current training image and the previous training image is minimized.

16. An apparatus comprising:

one or more processors configured to:

extract a color histogram from an input image represented in an original color space and obtain an original color histogram represented in a target color space;

obtain a transformed color histogram by removing color distortion from the original color histogram;

obtain a color transformation function from the original color histogram and the transformed color histogram;

input the input image to the color transformation function and output a color transformation image; and perform a transform on a pixel related to the color transformation image to obtain a space transformation image with a minimum target loss value between an output vector of a neural network for one of space transformation images and each of a plurality of candidate class vectors corresponding to recognition results classified in the neural network, the space transformation images being spaced apart from the color transformation image of the original color space by a distance less than a threshold.

17. The apparatus of claim 16, wherein the one or more processors are configured to input the space transformation image to the neural network and output a recognition result.

18. The apparatus of claim 17, wherein a candidate class vector corresponding to a lowest loss value among loss values of the space transformation images for each of the plurality of candidate class vectors is output as the final recognition result.

* * * * *